March 8, 1927. 1,619,980
C. W. KELSEY
STEERING GEAR
Filed April 19, 1923 4 Sheets-Sheet 1
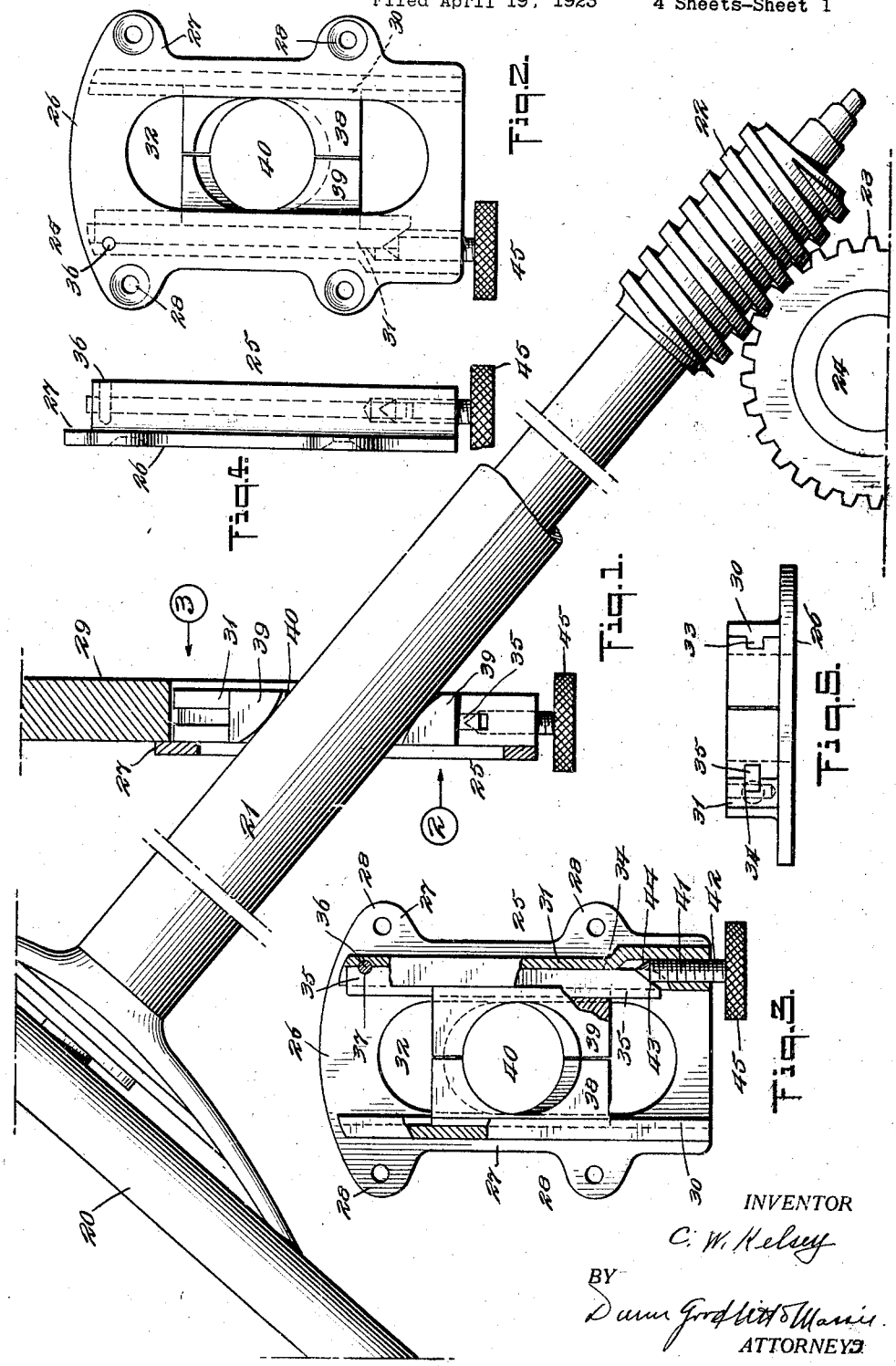
INVENTOR
C. W. Kelsey
BY
ATTORNEYS

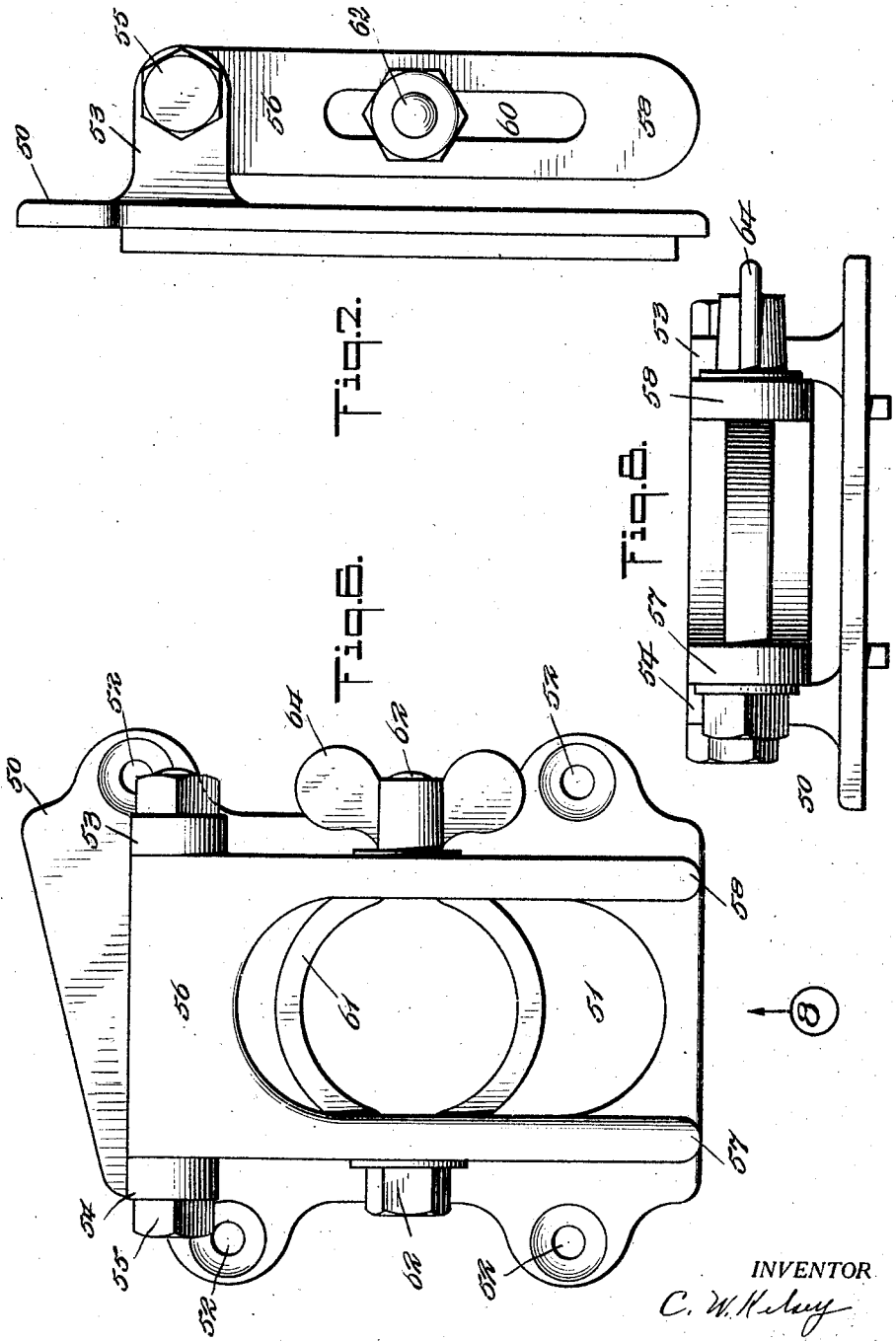

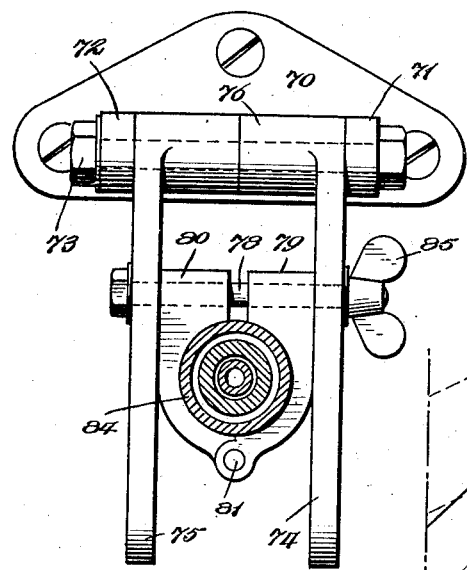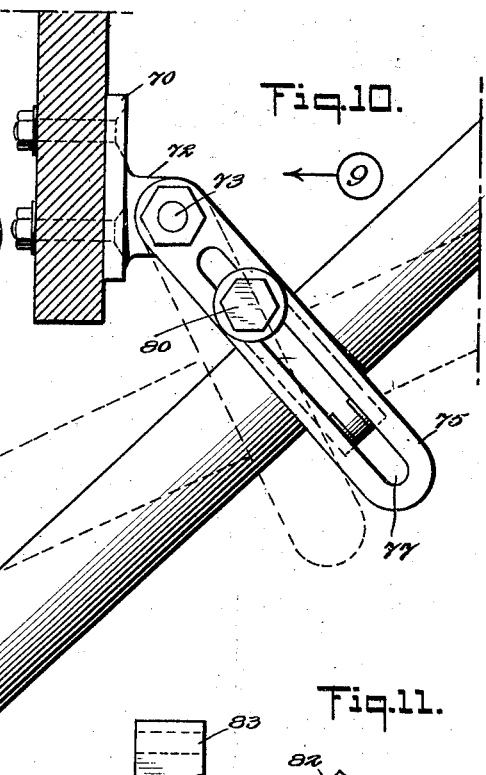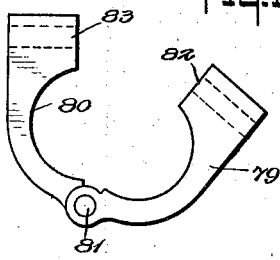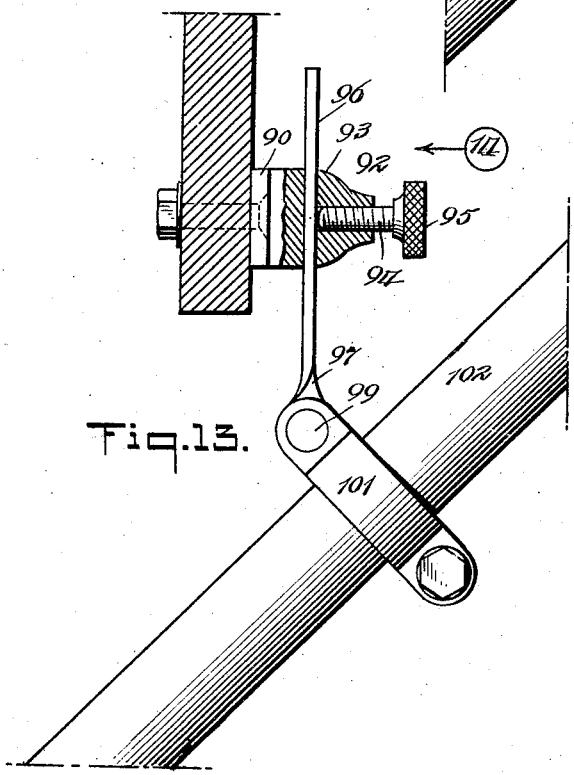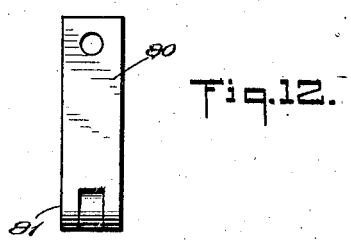

March 8, 1927. 1,619,980
C. W. KELSEY
STEERING GEAR
Filed April 19, 1923 4 Sheets-Sheet 4

INVENTOR
C. W. Kelsey
BY
ATTORNEYS

Patented Mar. 8, 1927.

1,619,980

UNITED STATES PATENT OFFICE.

CADWALLADER WASHBURN KELSEY, OF SHORT HILLS, NEW JERSEY.

STEERING GEAR.

Application filed April 19, 1923. Serial No. 633,144.

This invention relates to steering gear for motor vehicles and is more particularly directed toward a form of steering gear which can be readily adjusted to be within comfortable reach of the driver.

In selling automobiles, there is sometimes considerable sales resistance on account of the room provided for the driver and on account of the uncomfortable position in which it is necessary for some drivers to remain while operating the steering wheel. Some cars have room enough for one person to operate them comfortably, but have the control parts so spaced that it is very difficult for another person to handle them. Sales of cars are not infrequently lost on account of these difficulties; especially where it is desired to have a car which can be driven by either of two persons.

An object of the present invention is to provide a steering gear which may be adjusted with a minimum of effort, and without tools, to accommodate different drivers.

A more particular object of the invention is to provide a steering gear which may be bodily adjusted by raising or lowering the steering column and clamped in a selected position in an expeditious manner.

The accompanying drawings show for the purpose of illustration several of the many possible embodiments in which the invention may take form. In these drawings:

Fig. 1 is an elevational view of the parts in section showing one form of the adjustable steering gear;

Fig. 2 is an elevational view of the parts taken in the direction of the arrow 2 of Fig. 1;

Fig. 3 is an elevational view taken in the direction of the arrow 3 of Fig. 2, parts being in section;

Figs. 4 and 5 are elevational views of the structure shown in Figs. 2 and 3;

Fig. 6 is an elevational view of a modified form of clamping device;

Fig. 7 is a side elevation of the device shown in Fig. 6;

Fig. 8 is a section of Fig. 6 in the direction of the arrow 8;

Figs. 9 and 10 are elevational views of another form of steering gear, Fig. 9 being taken in the direction of the arrow 9 of Fig. 10;

Figs. 11 and 12 illustrate a form of clamping as used in Figs. 9 and 10;

Figs. 13 and 14 are elevational views illustrating a further modification, Fig. 14 being taken in the direction of the arrow 14 of Fig. 13;

Figure 15:
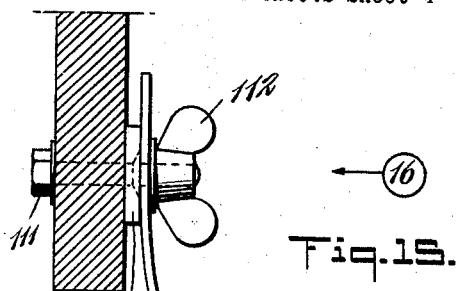
Figure 16:
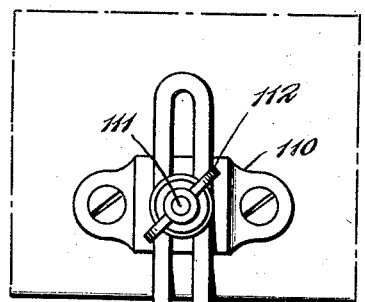

Figs. 15 and 16 are elevational views illustrating a further modification, Fig. 16 being taken in the direction of the arrow 16 of Fig. 15; and Fig. 17 illustrates a form of clamp shown in Figs. 15 and 16.

Referring now to the form of device illustrated in Figs. 1 through 5. A steering wheel is shown at 20 connected by means of the steering column 21 to worm 22 and worm wheel 23 for operating the remaining parts of the steering gear. The steering column 21 is pivotally mounted so as to swing in respect to the center 24 of the worm wheel 23. A device indicated generally by the reference character 25 is mounted on the dash 29 and this member is associated with the steering column 21 and is provided with suitable devices by which the steering column may be easily adjusted to various positions.

In the form shown in Fig. 5, the device 25 comprises a frame 26 having a peripheral flange 27 and lugs 28 by which it may be conveniently fastened to the dash or cowl 29, the flange providing a finished appearance to the assembled device. The frame 26 is provided with vertical guideways 30 and 31 and with an elongated slot 32 intermediate the guideways. The guideway 30 is here shown as having a key 33, while the guideway 31 has a keyway 34. The key 35 fits in the keyway 34, but is prevented from sliding relative to the keyway by a pin 36 mounted in the frame 26. For convenience in assembling, the key 35 is provided with a semicylindrical recess 37 to accommodate the pin 36. The key 33 and the key 35 provide parallel guideways in which the clamping devices 38 and 39 may slide. These clamping devices are here shown in the form of blocks which together provide an oblique aperture 40 through which the steering column 21 may pass.

The lower end of the frame 25 is provided with a threaded hole 41 directly underneath the keyway 34 and a screw 42 is adapted to be threaded through the hole 41. The lower end of the key 35 is beveled as indicated at 43, while the upper end of the screw 42 is conical as shown at 44. The screw 42 is provided with a large head 45 so that it can be easily manipulated to move the key laterally.

After the device has been assembled as indicated in Fig. 1, adjustments may be very easily made by merely loosening the screw 42 which will permit the key 35 to swing on a pivot pin 36, thereby loosening the blocks 38 and 39 relative to the keys 33 and 35. The steering column may then be raised or lowed as desired within the limits of the slot 32. Thereafter the screw 42 is tightened, which by reason of the cone and wedge 44 and 43 will move the key 35 to clamp the blocks 38 and 39 in position. This adjusting operation can be carried out by anyone without difficulty and without the use of tools.

The device as shown in Figs. 6, 7 and 8 includes a plate 50 having a central elongated aperture 51 and apertured lugs or ears 52 for attachment to the instrument board or cowl of the automobile. The plate 50 is also provided with two upstanding lugs 53 and 54 apertured to carry a bolt 55 on which is freely mounted a depending member 56 having bifurcations 57 and 58. The bifurcations 57 and 58 are each provided with elongated slots 60 and a ring 61 is mounted between the bifurcations on studs 62 and 63, which pass through the slots 60 in the bifurcations. A wing nut 64 is provided for clamping the ring 61 in position in the bifurcated member 56. According to this form of the invention, the steering column is passed downwardly through the ring 61 and the position of the steering column may be adjusted by merely loosening the wing nut 64 so that the column may be slid up and down in the bifurcations, the depending member 56 being swung on the bolt 55 whereupon the wing nut is again tightened, to clamp the steeering column in the ring 61.

Figure 12:
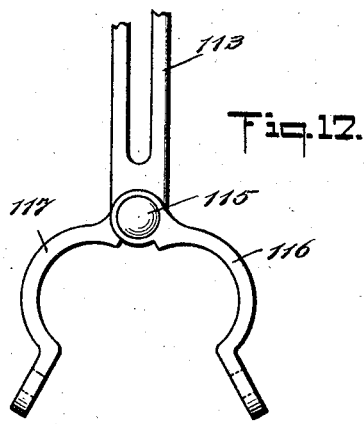

In Figs. 9 and 12, a bracket member 70 is fastened to the dash or cowl of the automobile and this bracket member is provided with outstanding lugs 71 and 72 through which pass a bolt 73. This bolt carries between the lugs 71 and 72 a pair of depending members 74 and 75 which may either be integral with a connecting member 76, whereby they are mounted on the bolt 73. The bifurcations 74 and 75 are slotted as shown at 77 and a bolt 78 passes through these bifurcations. Suitable clamping members in the form of blocks 79 and 80 are hinged together at 81, these blocks being drilled at 82 and 83 to accommodate the bolt 78. The blocks are properly shaped so as to fit the steering column 84 and a wing nut 85 is provided for tightening the clamping blocks about the steering column.

The adjustment of the steering column, according to this design, is very similar to that shown in Figs. 6, 7 and 8.

Figure 14:
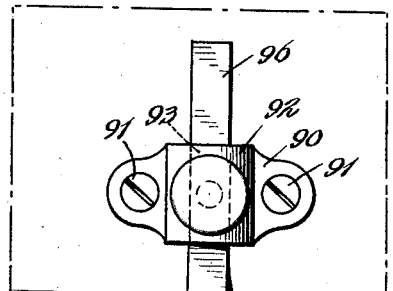

According to the embodiment of the invention shown in Figs. 13 and 14, the dash or cowl of the machine is provided with a mounting block 90 fastened in place by screws or bolts 91. This block is provided with an outstanding lug 92 having a vertical aperture 93 and a threaded horizontal bore 94. A clamping screw 95 is passed through the threaded bore 94 to clamp a bar 96 which is passed through the vertical aperture 93. The lower end of bar 96 is twisted as at 97 and is provided with a hole 98 to accommodate a rivet 99 which passes through a pair of straps 100 and 101 as shown. These straps are adapted to embrace the steering column 102 and may be clamped tightly on the column by means of a bolt 103 and nut 104, passed through the lower ends of the straps. In making an adjustment according to the present form of device, it is only necessary to loosen the nut 104 and the screw 95 and raise or lower the steering column as desired and then clamp the parts back in position. The straps may swing upon the rivet 99 sufficiently so as to accommodate the clamp to the angularity of the steering column.

Figs. 15, 16 and 17 show a further embodiment of the present invention, according to which a mounting block 10 is mounted on the cowl in the manner similar to the mounting of block 90. In the present case, the mounting block 110 is provided with a bolt 111 and wing nut 112 threaded onto the projecting end of the bolt. A metal strap 113 is provided with a slot 114 through which the bolt 111 is adapted to pass and the lower end of the strap 113 is fastened by means of a rivet 115 to clamping straps 116 and 117 which are adapted to embrace the steering column 118 in a manner shown. A bolt 119 and nut 120 are provided for fastening the lower ends of the clamp together. The clamping members 116 and 117 may be pivoted about the rivet 115 so as to open up to admit the steering column and the strap 113 may be made sufficiently flexible so as to take care of the angularity of the steering column. In making an adjustment, it is simply necessary to loosen the bolt 111 and wing nut 112, move the column as desired and then tighten the members.

While several embodiments of the invention have been described, it is intended that these shall be considered as illustrative of the invention, as it is obvious that it can be embodied in any other equivalent form of device.

What is claimed is:

1. In combination, a steering column, a fixed member having a vertically elongated slot through which the steering column passes, guideways on opposite sides of the slot, devices slidably mounted in the guideways and embracing the steering column, and means for clamping the devices about the column and in the guideways.

2. In combination, a steering column, a fixed member having a vertically elongated slot through which the steering column passes, guideways on opposite sides of the slot, one of the guideways being in the form of a key mounted for lateral movement, devices slidably mounted in the guideways and embracing the steering column, and means for clamping the devices about the column and in the guideways.

3. In combination, a steering column, a fixed member having a vertically elongated slot through which the steering column passes, guideways on opposite sides of the slot, one of the guideways being in the form of a key mounted for lateral movement, devices slidably mounted in the guideways and embracing the steering column, and means for clamping the devices about the column and in the guideways, said means including means for laterally moving the key.

4. In combination, a steering column, a fixed member having a vertically elongated slot through which the steering column passes, a guideway on one side of the slot, a groove opposite the guideway, a key mounted in the groove, a device for preventing sliding of the key, a clamp in the form of two blocks, one slidable relative to the guideway and the other slidable along the key, said clamp embracing the steering column, and means for laterally shifting the key to force the second block toward the first block.

5. In combination, a steering column, a fixed member having a vertically elongated slot through which the steering column passes, a guideway on one side of the slot, a groove opposite the guideway, a key mounted in the groove, a device for preventing sliding of the key, a clamp in the form of two blocks, one slidable relative to the guideway and the other slidable along the key, said clamp embracing the steering column, and means for laterally shifting the key to force the second block toward the first block, said means including a threaded member in wedging engagement with the key.

6. A clamping device for a steering column, comprising normally parallel guideways adapted to be on opposite sides of the steering column, one of which is in the form of a laterally movable key, and means for moving the key toward or from the other guideway.

7. A clamping device for a steering column, comprising normally parallel guideways adapted to be on opposite sides of the steering column, one of which is in the form of a laterally movable key having an oblique end and a conically tipped screw engaging the oblique end of the key.

CADWALLADER WASHBURN KELSEY.